United States Patent

[11] 3,590,211

| [72] | Inventors | John T. Ballass<br>Norwich;<br>Samuel Goodman, New London, both of, Conn. |
|---|---|---|
| [21] | Appl. No. | 717,030 |
| [22] | Filed | Mar. 28, 1968 |
| [45] | Patented | June 29, 1971 |
| [73] | Assignee | General Dynamics Corporation<br>New York, N.Y.<br>Continuation of application Ser. No. 475,854, July 29, 1965, now abandoned. |

[54] METHOD OF MAKING HIGH STRENGTH WELDS IN HY-110 TO HY-150 STEEL
7 Claims, No Drawings

[52] U.S. Cl. .................................................... 219/137, 75/125, 219/145
[51] Int. Cl. ........................................................ B23k 9/00
[50] Field of Search ........................................... 219/145, 146, 137; 75/125

[56] References Cited
UNITED STATES PATENTS

| 3,139,508 | 10/1962 | Freeman et al. | 219/137 |
| 3,215,814 | 11/1965 | Dorschy | 219/145 |

Primary Examiner—J. V. Truhe
Assistant Examiner—George A. Montanye
Attorney—Brumbaugh, Graves, Donohue & Raymond ABSTRACT: A method of making weld metal having a yield strength in the range of from about 110,000 p.s.i. to about 150,000 p.s.i. and high toughness comprising the step of consuming in a shielded arc a weld wire consisting essentially of, by weight, about 0.12 percent maximum carbon, 0.010 percent maximum phosphorus, 0.010 percent maximum sulfur, 1.2 percent to 2.00 percent manganese, 0.40 percent to 1.00 silicon, 1.5 percent to 3.0 percent nickel, 0.40 percent to 1.00 percent molybdenum, 0.40 percent to 1.00 percent copper, 0.08 percent maximum zirconium, the remainder being essentially iron.

METHOD OF MAKING HIGH STRENGTH WELDS IN HY-110 TO HY-150 STEEL

This application is a continuation of U.S. Pat. application Ser. No. 475,854, filed July 29, 1965 now abandoned.

BACKGROUND OF THE INVENTION

This invention relates to a method of making high-strength, high-toughness welds and particularly to the use of a weld wire for use in welding alloy steels having high-yield strengths and high-impact resistances.

Quenched and tempered high-yield strength alloy steels having high-impact resistance and yield strengths in the range from about 110,000 to 150,000 p.s.i. and higher have been available for some time, and have found special uses in the aircraft and rocket industries. While interest in these steels has been shown in structural applications, such as naval vessels, armor plate and submarine hulls, they have not as yet found widespread use in shipbuilding because of the difficulties involved in fabricating by present welding techniques. A full discussion of the various problems involved in fabricating large articles from these steels is found in NRL Report 5892, "Factors That Determine the Applicability of High Strength Quenched and Tempered Steels to Submarine Hull Construction," W. S. Pellini and P. P. Puzak, Dec. 5, 1962.

The present invention provides an alloy steel welding wire which is particularly useful in welding high-strength quenched and tempered steels having yield strengths in the approximate range of 110,000 to 150,000 p.s.i. These steels are commonly known as HY-110 to HY-150, and these designations will be used hereinafter in the application and claims to describe the steel alloys described above. The total content of alloying elements found in these steels may exceed 5 percent. In this respect, these steels form a class separate from the low-alloy high-strength steels commonly designated HY-80 to HY-100, i.e., those having yield strengths in the range of 80,000 to 100,000 p.s.i., and a total content of alloying elements of less than 5 percent.

A number of welding wire formulae are presently available for use in welding high-strength alloy steels. None, however, is known to produce a weld metal which, without subsequent heat treatment, will have the strength and toughness properties suitable for the steel alloys of the HY-110 to HY-150 class. While subsequent heat treatment of weldments made in HY-110 to HY-150 steels, with presently available welding wire, may provide improvement in the desired properties, it will be recognized that such treatment cannot be applied to large articles, such as hulls of ships, armor plate and the like, because of the expensive apparatus involved. It is thus desirable to provide a weld wire which will provide weldments having strength properties which will match those properties of the steel being welded without the use of a subsequent heat treatment step.

It has now been found that weldments having the desired properties in quenched and tempered alloy steels of the class HY-110 to HY-150 may be provided with a welding wire having a percent weight analysis within the ranges set forth in the following table:

| Element: | Percentage by weight |
|---|---|
| Carbon max. | 0.12 |
| Phosphorus | 0.010 |
| Sulfur | 0.010 |
| Manganese | 1.2–2.00 |
| Silicon | 0.40–1.00 |
| Nickel | 1.5–3.0 |
| Molybdenum | 0.40–1.00 |
| Copper | 0.40–1.00 |
| Zirconium max. | .08 |
| Iron, Balance. | |

In addition to elements listed in the table above, the weld wire of this invention can tolerate the presence of certain other elements without adverse effects. These elements include tungsten, 1.00 percent max., and titanium 0.08 percent max.

Unlike the usual high-yield strength alloy steel, the composition of this invention does not use aluminum as a deoxidizing agent. In place of aluminum, the applicants have found that deoxidizing agents such as zirconium, calcium or silicon may be employed to advantage as will be more fully discussed below.

The welding wire of this invention may be employed with various automatic welding processes and will produce a weld metal which, without subsequent heat treatment, will have the strength and toughness properties suitable for this class of high-yield strength alloy steels. Weldments made with the weld wire of this invention combine high-strength and superior impact resistance at all temperatures normally encountered, including extreme low temperatures. Moreover, weldments formed by the alloy welding wire of this invention may be stress relieved by heat treatment without impairing their desirable properties. The advantages of the weld wire of this invention may be obtained where the wire is employed with gas metal arc welding processes, the submerged arc welding process, and other conventional arc welding processes.

The high-yield strength steel weld wire of this invention may be prepared by steel making processes commonly used today to prepare steels of aircraft quality. The processes must provide well refined, clean metal. In accordance with one suitable process, the steel may be arc melted and readled to adjust the chemistry of the steel and to remove any undesirable elements and compounds and subsequently teemed in air or argon. Vacuum melting conditions may be used and optimum cleanliness must be observed in order to maintain residual elements at a low level. In accordance with another method, the steel may be air arc melted to reduce impurities such as sulfur, subsequently cast and then remelted with the vacuum induction process for maximum control of impurities such as aluminum and gases. After refining, the alloy is cast, wrought, forged or extruded into any desired form or shape for use as welding wire. Examples of suitable refining techniques are the special steel making practices:

a. vacuum-carbon-deoxidation and air teemed, and
b. vacuum-carbon-deoxidation and consumable electrode remelt.

As mentioned above, the melt must be fully killed during the refining process with a deoxidizing agent, such as zirconium, calcium or silicon. The use of aluminum as a deoxidizing agent is unsuitable, as residual amounts of aluminum thus contributed to the wire cause a loss in impact resistance of the resulting weld metal when deposited by gas metal arc welding process techniques. It is also important that no more than a slight excess of deoxidizing agent be employed. Excess amounts of zirconium, for example, will also cause a significant loss in impact resistance in the weld metal deposited by the gas metal arc welding process. The amount of deoxidizer used to kill the melt must be carefully controlled so that it may be fully killed, and at the same time leave a minimum residual amount of deoxidizer in the wire.

The adverse effect of aluminum is apparently dependent to some extent upon the point of addition in the refining process. It has been noted that the presence of as much as 0.03 percent aluminum can be tolerated without a loss in impact resistance where the aluminum was present as an impurity in the melt from the initial addition of melt ingredients. However, where aluminum was added as a deoxidizing agent, residual amounts thereof remaining in the wire provided a wire which gave weldments which are unacceptably weak.

Illustrative compositions of steels within the class of HY-110to are as follows:

| Element | A | B | C |
|---|---|---|---|
| C | 0.14 | 0.26 | 0.10 |
| Mn | 0.30 | 0.13 | 0.72 |
| Si | 0.20 | 0.04 | 0.28 |
| S | 0.007 | 0.006 | 0.005 |
| P | 0.004 | 0.004 | 0.007 |
| Ni | 7.20 | 3.12 | 5.03 |
| Cr | 0.93 | 1.48 | 0.60 |
| Mo | 1.07 | 0.90 | 0.54 |
| Cb | | 0.09 | |
| V | | | 0.07 |
| Al | | | 0.017 |

These steels were prepared by special melting practices. The steel of Column A was prepared by the vacuum-carbon-deoxidation and air teemed process, while the steel of Column B was prepared by the vacuum-carbon-deoxidation and consumable electrode remelt process. The steel of column C was prepared by the electric furnace air-arc melted method.

Welding processes other than shielded inert gas process may be employed by the welding wire of this invention although the latter is preferred. Other such processes include the submerged arc process, the electroslag process and processes employing a solid wire with a flux shield, a solid wire with a magnetic flux shield, a solid wire with other than a gas shield and a flux cored wire with a gas shield.

The invention is illustrated by the following examples.

EXAMPLE 1

An alloy steel welding wire in accordance with the invention has the following composition:

| Element: | Percent by weight |
|---|---|
| Carbon | 0.110 |
| Manganese | 1.310 |
| Phosphorus | 0.013 |
| Sulfur | 0.006 |
| Silicon | 0.740 |
| Nickel | 1.700 |
| Molybdenum | 0.630 |
| Copper | 0.620 |
| Zirconium | 0.082 |
| Iron, Remainder. | |

This wire was prepared by conventional basic electric arc melting practice and no aluminum was used as a deoxidizing agent. The melt was cooled and drawn into a wire having a diameter of one-sixteenth inch.

A weld was deposited with the welding wire described above using the gas shielded arc welding process at 340 amps., 29 volts, 13 ¼ inches per minute travel speed and a shielding gas containing 99 percent argon and 1 percent oxygen.

The following properties of the "as deposited" weld metal (not stress relieved) were found:

Ultimate Tensile Strength      139,800 p.s.i.
Yield Strength (0.2 percent offset)      131,300 p.s.i.
Elongation in 1.4 inches      16.1 percent
Reduction in Area      42.2 percent
Charpy V-Notch Toughness at −80° F.,
Full Size Standard ASTM Charpy Bar 39 foot pounds

EXAMPLE 2

An additional alloy steel welding wire in accordance with the invention has the following composition:

| Element: | Percent by weight |
|---|---|
| Carbon | 0.100 |
| Sulfur | 0.004 |
| Phosphorus | 0.006 |
| Silicon | 0.740 |
| Manganese | 1.320 |
| Nickel | 1.750 |
| Copper | 0.650 |
| Molybdenum | 0.650 |
| Zirconium | 0.070 |
| Iron, remainder. | |

The wire described above was prepared by conventional basic electric arc melting practice and no aluminum was used as a deoxidizing agent. The melt was cooled and drawn into a wire having a diameter of five thirty-seconds inch.

A weld was deposited with the welding wire described above using the submerged arc welding technique with a flux having the following composition:

| Compound | Percent, by weight |
|---|---|
| SiO$_2$ | 34.0 |
| CaO | 17.0 |
| Al$_2$O$_3$ | 15.0 |
| MnO | 7.0 |
| CaF$_2$ | 14.0 |
| LiF | 13.0 |

The baseplate was preheated to 100° F. A 1 inch single bevel 45° groove butt joint was used with heat input of 44,500 joules per inch. Interpass temperature was also 100° F.

The following properties of the weld metal were found, in the "as welded" condition, and after being stress relieved by heating to 1150° F. and held at this temperature for 1 hour, followed by cooling in air.

| | Tensile strength, p.s.i. | yield strength 0.2% offset, p.s.i. | elongation in 1.4 inches | Percent Reduction in area, percent | Charpy V-notch impact toughness ft./lbs. test temperature, °F. | | | |
|---|---|---|---|---|---|---|---|---|
| | | | | | RT | 0 | −60 | −80 |
| As welded | 136,500 | 119,300 | 17.3 | 53.0 | 59 | 57 | 46 | 38 |
| Stress relieved | 123,300 | 115,800 | 20.0 | 58.4 | 61 | 43 | 26 | 24 |

EXAMPLE 3

Two alloy steel welding wires were prepared according to the invention having the following composition:

WIRE CHEMISTRY

| Element: | Percent, by weight |
|---|---|
| Carbon | .07 |
| Sulfur | .001 |
| Phosphorus | .005 |
| Silicon | .78 |
| Manganese | 1.41 |
| Nickel | 1.71 |
| Copper | .63 |
| Molybdenum | .48 |
| Zirconium | .08 |
| Iron, balance. | |

These wires were prepared by conventional basic electric arc melting practice and no aluminum was used as a deoxidizing agent. The melt was cooled and drawn into a wire having a diameter of one-sixteenth inch.

Each wire was used to deposit a weld using the inert gas shielded arc welding process. The joint design was a standard V of 45° with a one-eighth inch land and a one-eighth inch root. The process operated at 29 v. and 340 amps. to provide 45,000 joules per inch. The shielding gas comprised 99 percent argon and 1 percent oxygen and was supplied at 35 cubic feet per hour to the welding site. The preheat and interpass temperature employed was 200° F.

The properties of the weld metal in the "as deposited" condition were as follows:

| | V-notch charpy impact strength |
|---|---|
| Test temperature: | |
| RT | 81 |
| 0° F | 73 |
| −60° F | 53 |
| −80° F | 51 |
| Tensile strength, p.s.i. | 128,700 |
| Yield strength, 0.2% offset, p.s.i. | 109,900 |
| Percent elongation in 1.4 inches | 17.1 |
| Percent reduction in area | 42.6 |

EXAMPLE 4

Two additional alloy steel welding wires were prepared according to the invention having the following composition:

| | Ni | Si | Mn | Mo | Cu | C | S | P | Zr | Ti | W |
|---|---|---|---|---|---|---|---|---|---|---|---|
| A | 1.75 | .76 | 1.116 | .67 | .60 | .08 | .005 | .008 | .01 | .026 | |
| B | 1.75 | .81 | 1.43 | .64 | .60 | .08 | .005 | .009 | .03 | .005 | .82 |

These wires were also prepared by conventional basic electric arc melting practice and no aluminum was used as a deoxidizing agent. The melt was cooled and drawn into wire having a diameter of five thirty-seconds inch.

Welds were deposited with each of the welding wires described above using the submerged arc welding technique with a flux having the following composition:

| Compound: | Percent, by weight |
|---|---|
| $SiO_2$ | 34.0 |
| $CaO$ | 17.0 |
| $Al_2O_3$ | 15.0 |
| $MnO$ | 7.0 |
| $CaF_2$ | 14.0 |
| $LiF$ | 13.0 |

The baseplate was preheated to 200° F. A 1 inch single bevel 45° groove butt joint was used with heat input of 35,000 joules per inch. Interpass temperature was 300° F.

The following properties of the weld metal were found in the "as welded" condition:

| | Tensile strength, p.s.i. | Yield strength, .2% off-set, p.s.i. | Percent elongation in 1.4 inches | Reduction in area, percent | RT | 0 | −60 | −80 |
|---|---|---|---|---|---|---|---|---|
| A | 132,100 | 125,000 | 15.7 | 63.8 | 57 | 57 | 45 | 39 |
| B | 133,000 | 116,000 | 14.3 | 24.5 | 65 | 56 | 44 | 42 |

It will be understood that the above-described embodiments of the invention are illustrative only and modifications thereof will occur to those skilled in the art. Therefore, the invention is not to be limited to the particular examples described herein but is to be defined by the appended claims.

We claim:

1. A method of making a weldment having a yield strength in the range of from about 110,000 p.s.i. to about 150,000 p.s.i. and high toughness comprising the steps of; forming a joint between members of steel of the class HY-110 to HY-150, depositing weld metal in said joint to form a weldment therein by consuming a weld wire in a shielded arc at said joint, the weld wire consisting essentially of, by weight, about 0.12 percent maximum carbon, 0.010 percent maximum phosphorus, 0.010 percent maximum sulfur, 1.2 percent to 2.00 percent manganese, 0.40 percent to 1.00 percent silicon, 1.5 percent to 3.0 percent nickel, 0.40 percent to 1.00 percent molybdenum, 1.00 percent maximum copper, 0.08 percent maximum zirconium, and the remainder being essentially iron.

2. A method according to claim 1 wherein the weld contains, by weight, about 0.11 percent carbon, 0.74 percent silicon, 0.62 percent copper and 0.63 percent molybdenum.

3. A method according to claim 1 wherein the weld wire contains, by weight, about 0.10 percent carbon, 0.74 percent silicon, 0.65 percent copper and 0.65 percent molybdenum.

4. A method according to claim 1 wherein the weld wire contains, by weight, about 0.07 percent carbon, 0.78 percent silicon, 0.63 percent copper and 0.48 percent molybdenum.

5. A method according to claim 1 wherein the weld wire contains, by weight, about 0.08 percent carbon, 0.76 percent silicon, 0.60 percent copper and 0.67 percent molybdenum.

6. A method for making a weldment having a yield strength in the range of from about 110,000 p.s.i. to about 150,000 p.s.i. and high toughness comprising the steps forming a joint between members of steel of the class HY-110 to HY-150 of; depositing a weld wire in a joint to form a weldment therein by consuming the weld wire in a shielded arc at said joint, the weld wire consisting essentially of, by weight, about 0.12 percent maximum carbon, 0.010 percent maximum phosphorus, 0.101 percent maximum sulfur, 1.2 percent to 2.00 percent manganese, 0.040 percent to 1.00 percent silicon, 1.5 percent to 3.0 percent nickel, 0.40 percent to 1.00 percent molybdenum, 1.00 percent maximum copper, 0.08 percent maximum zirconium, 1.00 percent maximum tungsten, 0.08 percent maximum titanium, and the remainder being essentially iron.

7. A method according to claim 6 wherein the weld wire contains, by weight, about 0.08 percent carbon, 0.81 percent silicon, 0.60 percent copper and 0.64 percent molybdenum.

PO-1050
(5/69)

UNITED STATES PATENT OFFICE
CERTIFICATE OF CORRECTION

Patent No. 3,590,211  Dated June 29, 1971

Inventor(s) John T. Ballass et al.

It is certified that error appears in the above-identified patent and that said Letters Patent are hereby corrected as shown below:

In line 7 of the Abstract, after "1.00" insert --percent--;
Column 2, line 64, after "110 to", insert --HY-150--;
Column 4, in the headings of the table following line 15, above "elongation in 1.4 inches", insert --Percent--;
Claim 6, column 6, line 30, delete "0.040" and substitute --0.40--.

Signed and sealed this 21st day of March 1972.

(SEAL)
Attest:

EDWARD M. FLETCHER, JR.
Attesting Officer

ROBERT GOTTSCHALK
Commissioner of Patents